(12) United States Patent
Okuzono et al.

(10) Patent No.: US 12,438,440 B2
(45) Date of Patent: Oct. 7, 2025

(54) NOISE REDUCTION CIRCUIT, POWER CONVERSION DEVICE, AND REFRIGERATION APPARATUS

(71) Applicant: DAIKIN INDUSTRIES, LTD., Osaka (JP)

(72) Inventors: Kodai Okuzono, Osaka (JP); Yoshitsugu Koyama, Osaka (JP); Masaki Kono, Osaka (JP); Hirotaka Doi, Osaka (JP); Reiji Kawashima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 28 days.

(21) Appl. No.: 18/621,289

(22) Filed: Mar. 29, 2024

(65) Prior Publication Data

US 2024/0243730 A1     Jul. 18, 2024

Related U.S. Application Data

(63) Continuation of application No. PCT/JP2022/036641, filed on Sep. 30, 2022.

(30) Foreign Application Priority Data

Sep. 30, 2021   (JP) .................. 2021-162110

(51) Int. Cl.
*H02M 1/12*     (2006.01)
*H02M 1/44*     (2007.01)
(Continued)

(52) U.S. Cl.
CPC ............. *H02M 1/123* (2021.05); *H02M 1/44* (2013.01); *H02M 5/42* (2013.01); *H03H 11/04* (2013.01)

(58) Field of Classification Search
CPC .......... H02M 1/123; H02M 1/44; H02M 5/42; H02M 5/44; H03H 11/04
(Continued)

(56) References Cited

U.S. PATENT DOCUMENTS

2002/0075702 A1*  6/2002  Igarashi .................. H02M 1/12
                                                                 363/35
2005/0083132 A1*  4/2005  Tsuruya .................. H02M 1/12
                                                                 330/297
(Continued)

FOREIGN PATENT DOCUMENTS

JP          3044650 B2      5/2000
JP        2002-252985 A     9/2002
(Continued)

OTHER PUBLICATIONS

International Search Report for PCT/JP2022/036641 (PCT/ISA/210), mailed on Nov. 22, 2022.
(Continued)

*Primary Examiner* — William Hernandez
(74) *Attorney, Agent, or Firm* — Birch, Stewart, Kolasch & Birch, LLP

(57) ABSTRACT

A noise reduction circuit includes: noise canceler circuitry configured to inject a compensation current into a power line and ground to reduce a common mode noise current that flows through the power line and the ground into a commercial power supply from a power converter with a switching element connected to the commercial power supply; and overcurrent inhibitor circuitry provided on a compensation current path through which the compensation current flows, the overcurrent inhibitor circuitry being configured to inhibit application of an overcurrent to the noise canceler circuitry.

14 Claims, 8 Drawing Sheets

(51) Int. Cl.
  *H02M 5/42* (2006.01)
  *H03H 11/04* (2006.01)
(58) Field of Classification Search
  USPC .................................................. 327/551, 552
  See application file for complete search history.

(56) References Cited

U.S. PATENT DOCUMENTS

| | | |
|---|---|---|
| 2013/0147419 A1 | 6/2013 | Sakai et al. |
| 2017/0047881 A1 | 2/2017 | Shimura et al. |
| 2022/0376684 A1* | 11/2022 | Nagasawa ................. H02J 1/02 |
| 2023/0045961 A1* | 2/2023 | Ishii ........................ H02M 1/15 |
| 2024/0204651 A1* | 6/2024 | Okuzono ............ H02M 1/0009 |
| 2025/0175160 A1* | 5/2025 | Fujita .................... H02M 5/458 |

FOREIGN PATENT DOCUMENTS

| | | |
|---|---|---|
| JP | 2004-534500 A | 11/2004 |
| JP | 2007-282313 A | 10/2007 |
| JP | 2017-38500 A | 2/2017 |
| KR | 10-2129578 B1 | 7/2020 |
| WO | WO 03/005578 A1 | 1/2003 |
| WO | WO 2021/166018 A1 | 8/2021 |

OTHER PUBLICATIONS

Extended European Search Report for European Application No. 22876523.6, dated Jan. 7, 2025.

* cited by examiner

NOISE REDUCTION CIRCUIT, POWER CONVERSION DEVICE, AND REFRIGERATION APPARATUS

CROSS REFERENCE TO RELATED APPLICATIONS

This application is a Continuation of PCT International Application No. PCT/JP2022/036641 filed on Sep. 30, 2022, which claims priority under 35 U.S.C. § 119(a) to Patent Application No. 2021-162110 filed in Japan on Sep. 30, 2021, all of which are hereby expressly incorporated by reference into the present application.

TECHNICAL FIELD

The present disclosure relates to a noise reduction circuit, a power conversion device, and a refrigeration apparatus.

BACKGROUND ART

Patent Literature 1 discloses a noise reduction device for a power conversion device, where an electric motor as a load is connected to an inverter device consisting of an AC power supply, a rectifier circuit, a smoothing capacitor, and an inverter circuit, a leakage current detector is connected between the AC power supply and the rectifier circuit, an NPN first transistor is connected between one end of the smoothing capacitor and a case of the electric motor, a PNP second transistor is connected between the case of the electric motor and the other end of the smoothing capacitor, and the first and second transistors are driven by output of the leakage current detector to inject a current to cancel common mode noise.

CITATION LIST

Patent Literature

Patent Literature 1: Japanese Patent No. 3044650

SUMMARY

A noise reduction circuit according to the present disclosure comprises: noise canceler circuitry configured to inject a compensation current into a power line and ground to reduce a common mode noise current that flows through the power line and the ground into a commercial power supply from a power converter with a switching element connected to the commercial power supply; and overcurrent inhibitor circuitry provided on a compensation current path through which the compensation current flows, the overcurrent inhibitor circuitry being configured to inhibit application of an overcurrent to the noise canceler circuitry.

DESCRIPTION OF EMBODIMENTS

Certain embodiments will be described below with reference to the appended drawings.

First Embodiment

Figure 1:
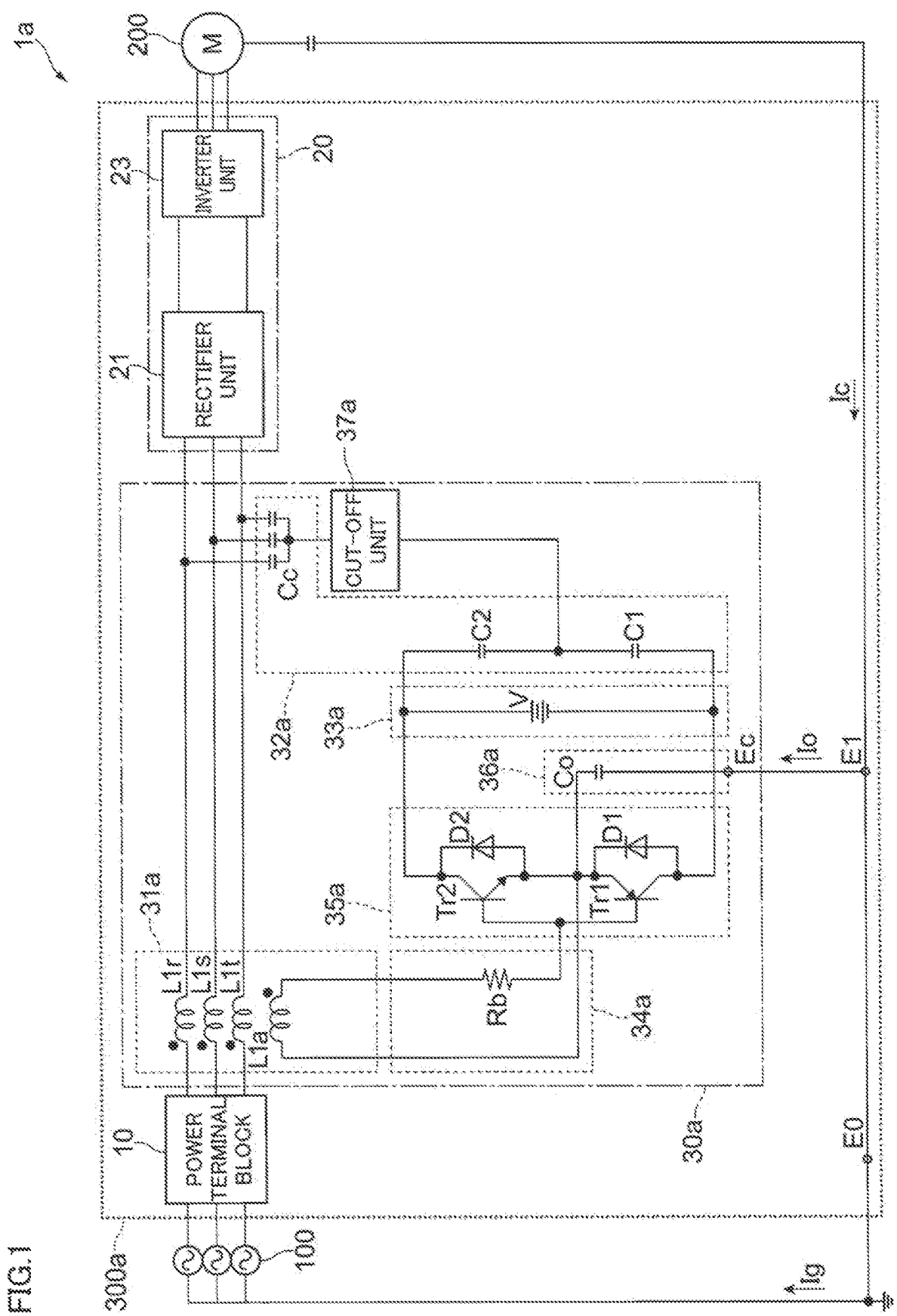
FIG. 1 illustrates a circuit configuration of a power conversion system according to a first embodiment.

FIG. 1 illustrates a circuit configuration of a power conversion system $1a$ according to a first embodiment. As shown, the power conversion system $1a$ includes an AC power supply 100, a motor 200, and a power conversion device $300a$.

The AC power supply 100 is, for example, a three-phase three-wire commercial AC power supply and supplies AC to the power conversion device $300a$. The first through third phases are herein denoted as R-, S-, and T-phases, respectively. Power lines supplying the R-, S-, and T-phases are denoted as R-, S-, and T-phase power lines, respectively. These power lines may be simply denoted as "power lines" when a distinction between the phases is not necessary. While the following description discusses the use of the three-phase three-wire AC, a similar concept can be applied to the use of three-phase four-wire AC or single-phase AC.

The motor 200 is connected to the power conversion device $300a$ and controlled by the three-phase AC as a load. The motor 200 may be, for example, a DC brushless motor. Alternatively, the motor 200 may be any other three-phase AC motor.

The power conversion device $300a$ includes a power terminal block 10, a power converter 20, and a noise reduction circuit $30a$.

The power terminal block 10 is a portion for connection to wiring used to input AC from the AC power supply 100. The power terminal block 10 has an R-phase input terminal, an S-phase input terminal, and a T-phase input terminal (all not shown). The power terminal block 10 may also include a ground terminal E0, located remote from the power terminal block 10 in the figure, for connection to an external ground wire.

The power converter 20 includes a rectifier unit 21 and an inverter unit 23. In the power converter 20, the rectifier unit 21 and the inverter unit 23 are connected in this order from the AC power supply 100 side. The inverter unit 23 is connected to the motor 200.

The rectifier unit 21 rectifies the AC supplied from the AC power supply 100 into DC. The inverter unit 23 converts the DC output from the rectifier unit 21 into three-phase AC and supplies it to the motor 200. The inverter unit 23 includes a switching element (not shown). For example, the switching element may be an insulated gate bipolar transistor (IGBT). A smoothing unit to smooth the DC output from the rectifier unit 21 may be provided between the rectifier unit 21 and the inverter unit 23. A reactor and an LC circuit may be provided between the rectifier unit 21 and the inverter unit 23 in order to reduce entry of a noise current, which is due to the switching operation of the switching element of the inverter unit 23, into the AC power supply 100, where the LC circuit may be configured with a capacitor with a capacitor capacitance that can hardly smooth the DC voltage output from the rectifier unit 21 but can suppress the ripple voltage caused by the switching operation.

The noise reduction circuit 30a is an active common mode noise reduction circuit that detects common mode noise and performs feedback control to suppress it. The noise reduction circuit 30a includes a noise detection unit 31a, a coupling capacitor unit 32a, a DC power supply unit 33a, a detection circuit 34a, an amplifier 35a, an output capacitor unit 36a, and a cut-off unit 37a.

The noise detection unit 31a detects a common mode noise current. An example of the noise detection unit 31a is a detection core. The detection core may include conductive wires to be passed through the toroidal core. However, the example here describes the detection core that includes coils (winding wires) L1r, L1s, L1t, and L1a.

The coils L1r, L1s, and L1t are connected in series to the respective R-, S-, and T-phase power lines. Here, the coil refers to a conductive wire wound in a helical (loop) shape to form an inductor.

These coils L1r, L1s, and L1t are conductive wires (wires) that form part of the power lines and are wound around a single toroidal core. The toroidal core is, for example, composed of a magnetic material such as an annular (doughnut-shaped) ferrite with a circular cross-section. The toroidal core may also be called an iron core. The toroidal core does not need to be annular, and may be of a polygonal frame shape such as a square or triangle. The cross-sectional shape may also be square, triangular, etc.

The coils L1r, L1s, and L1t are wound around the single toroidal core such that they are adjacent to each other. Accordingly, the coils L1r, L1s, and L1t are magnetically coupled (have magnetic coupling) with each other. The coils L1r, L1s, and L1t are wound to have the polarity indicated by the dots "•" in FIG. 1.

The coil L1a is provided to be magnetically coupled (have magnetic coupling) with the coils L1r, L1s, and L1t. For example, the coil L1a is wound around the single toroidal core such that it is adjacent to the coils L1r, L1s, and L1t. Alternatively, the coil L1a may be wound to overlap the coils L1r, L1s, and L1t that are wound around the single toroidal core such that they are adjacent to each other. The coil L1a is wound to have the polarity indicated by the dot "•" in FIG. 1.

The coils L1r, L1s, L1t, and L1a are wound such that, when a current flows through the coils L1r, L1s, and L1t in the right direction in the figure for example, the current flows through the coil L1a in the left direction in the figure. Accordingly, the polarity indicated by the dots "•" as described above is the polarity according to the direction in which the current flows.

A common mode noise current is a high-frequency current that leaks to ground through the stray capacitance of the motor 200 and other components due to the switching of a switching element St in the inverter unit 23. Accordingly, the common mode noise current flows between the R-, S-, and T-phase power lines and the ground.

When a common mode noise current flows through the coils L1r, L1s, and L1t, a current proportional to the common mode noise current is induced in the coil L1a through the toroidal core. In this case, the coils L1r, L1s, and L1t as well as the coil L1a function as a current transformer and constitute a detection transformer to detect the common mode noise current.

The coupling capacitor unit 32a includes a coupling capacitor Cc and capacitors C1 and C2. The capacitors C1 and C2 are connected in series and connected in parallel to the DC power supply unit 33a and the amplifier 35a. Three terminals of the coupling capacitor Cc on one end thereof are connected to the R-, S-, and T-phase power lines, respectively. The terminal of the coupling capacitor Cc on the other end thereof is connected to the cut-off unit 37a. The coupling capacitor unit 32a defines a path for flow of a compensation current between the R-, S-, and T-phase power lines and the amplifier 35a through the coupling capacitor Cc and the capacitors C1 and C2.

The DC power supply unit 33a includes a DC power supply V. The DC power supply V supplies a DC voltage to the amplifier 35a.

The detection circuit 34a includes a base resistor Rb. The base resistor Rb is a resistor for limiting the base current flowing through the amplifier 35a. Here, the circuit connected between the connection of the detection core and the base resistor Rb is defined as the detection circuit.

The amplifier 35a includes first and second transistors Tr1 and Tr2, which are examples of the first and second current control elements, and first and second diodes D1 and D2.

The first transistor Tr1 is connected between one end of the DC power supply V and the output capacitor unit 36a. The second transistor Tr2 is connected between the other end of the DC power supply V and the output capacitor unit 36a. The first transistor Tr1 is of a PNP type and the second transistor Tr2 is of an NPN type, and the first and second transistors Tr1 and Tr2 have mutually opposite polarity. The bases (control terminals) of the first and second transistors Tr1 and Tr2 are connected to one output line of the coil L1a, and the interconnection points of the first and second transistors Tr1 and Tr2 are connected to the other output line of the coil L1a. This causes the first and second transistors Tr1 and Tr2 to operate opposite each other.

The first and second diodes D1 and D2 are connected in reverse parallel to the first and second transistors Tr1 and Tr2 to protect them.

In this example, the amplifier 35a includes the transistors. However, the amplifier 35a may include operational amplifiers rather than the transistors.

The output capacitor unit 36a includes an output capacitor Co. The output capacitor Co is connected on its one end to a connection point of the first and second transistors Tr1 and Tr2 on the emitter side, and is connected on its other end to a ground terminal E1 of the housing via a compensation current path connection terminal Ec. Other implementations are also possible where the output capacitor unit 36a is absent or the output capacitor unit 36a includes, in addition to the output capacitor Co, a resistor directly connected to the output capacitor Co. Still alternatively, an implementation is possible where the output capacitor unit 36a is connected to the power lines and the DC power supply unit 33a is connected to the ground either directly or via a coupling capacitor.

In the first embodiment, the detection circuit 34a, the amplifier 35a, and the output capacitor unit 36a constitute a noise canceler.

The cut-off unit 37a is connected between the coupling capacitor Cc and a connection point of the series-connected capacitors C1 and C2. The cut-off unit 37a inhibits an overcurrent from flowing through the compensation current path to thereby inhibit application of the overcurrent to the amplifier 35a. In that sense, the cut-off unit 37a is an example of the overcurrent inhibitor.

For example, the cut-off unit 37a may be a cut-off relay that switches the compensation current path between conduction and cut-off. In such a case, the cut-off unit 37a makes the compensation current path conductive in response to a DC voltage being applied to the amplifier 35a from the DC power supply unit 33a, and cuts off the compensation current path absent the application of a DC voltage to the amplifier 35a from the DC power supply unit 33a. Also, when the compensation current path is in a conductive state, the cut-off unit 37a cuts off the compensation current path in response to the absolute value of the neutral point voltage of the power line with respect to ground fluctuating above a voltage that is 2×1.1 times the rated voltage in the commercial power supply, or the AC power supply 100. Alternatively, when the compensation current path is in a conductive state, the cut-off unit 37a cuts off the compensation current path in response to an overcurrent being applied to the amplifier 35a.

It should be noted that the above term "cut-off" does not mean allowing no current to pass at all; rather, the term "cut-off" may encompass allowing a small amount of current to pass. In other words, the cut-off unit 37a may switch the compensation current path between high impedance and low impedance. In such a case, the cut-off unit 37a places the compensation current path into a low impedance state in response to a DC voltage being applied to the amplifier 35a from the DC power supply unit 33a, and places the compensation current path into a high impedance state absent the application of a DC voltage to the amplifier 35a from the DC power supply unit 33a. Also, when the compensation current path is in a low impedance state, the cut-off unit 37a places the compensation current path into a high impedance state in response to the absolute value of the neutral point voltage of the power line with respect to ground fluctuating above a voltage that is $\sqrt{2}\times 1.1$ times the rated voltage in the commercial power supply, or the AC power supply 100. Alternatively, when the compensation current path is in a low impedance state, the cut-off unit 37a places the compensation current path into a high impedance state in response to an overcurrent being applied to the amplifier 35a.

In the above description, the condition for placing the compensation current path into a cut-off or high impedance state is that the absolute value of the neutral point voltage of the power line with respect to ground fluctuates above a voltage that is $\sqrt{2}\times 1.1$ times the rated voltage in the commercial power supply. This condition is detailed here. In general, the absolute value of the neutral point voltage of the power line with respect to ground does not exceed the voltage of the commercial power supply under normal conditions. Also, the allowable range of voltage fluctuation of commercial power supplies is limited by relevant standards and is, for example, ±10% according to the European standard EN50160. Accordingly, if the absolute value of the neutral point voltage of the power line with respect to ground exceeds 110% of 2 times the rated voltage, which is the peak value of the rated voltage in the commercial power supply, an abnormal condition is determined and the compensation current path is protected. However, the criterion of 110% is only an example, and other criteria may be adopted.

The operation of the power conversion system 1a according to the first embodiment will now be described.

The commercial AC power supply 100 supplies an AC voltage to the power converter 20 via the power terminal block 10. In the power converter 20, the rectifier unit 21 rectifies the AC voltage supplied from the AC power supply 100 to a DC voltage. The inverter unit 23 supplies an AC voltage to the motor 200 through on/off control of the switching element.

In this case, a common mode noise current Ic flows from the motor 200 every time a pulsed voltage is applied from the inverter unit 23, as shown in the figure. The noise detection unit 31a detects the common mode noise current in the power lines input to the power converter 20 and drives the first and second transistors Tr1 and Tr2. In response to a detection current from the noise detection unit 31a flowing into the bases of the first and second transistors Tr1 and Tr2, this current is amplified by the first and second transistors Tr1 and Tr2.

First, the case in which the cut-off unit 37a is in a conductive state is described.

When the first transistor Tr1 is on (when a positive common mode noise current Ic is generated), a compensation current Io is supplied from the DC power supply V and flows along a current path (compensation current path) that runs from the positive terminal of the DC power supply V through the capacitor C2, the coupling capacitor Cc, the AC power supply 100, the output capacitor Co, and the first transistor Tr1 to the negative terminal of the DC power supply V. In this case, the common mode noise current Ic, the compensation current Io, and a post-compensation common mode noise current Ig flow in the direction of the arrows in the figure. The compensation current Io reduces the common mode noise current Ic by being subtracted from the common mode noise current Ic from the motor 200. In other words, the compensation current Io compensates for the common mode noise current Ic.

When the second transistor Tr2 is on (when a negative common mode noise current Ic is generated), the compensation current Io is supplied from the DC power supply V and flows along a current path (compensation current path) that runs from the positive terminal of the DC power supply V through the second transistor Tr2, the output capacitor Co, the AC power supply 100, the coupling capacitor Cc, and the capacitor C1 to the negative terminal of the DC power supply V. In this case, the common mode noise current Ic, the compensation current Io, and the post-compensation common mode noise current Ig flow in the direction opposite the arrows in the figure. The negative compensation current Io reduces the common mode noise current Ic by being subtracted from the negative common mode noise current Ic from the motor 200. In other words, the compensation current Io compensates for the common mode noise current Ic.

As described above, in both cases when the first transistor Tr1 is on and when the second transistor Tr2 is on, the post-compensation common mode noise current Ig flows in the AC power supply 100.

On the other hand, when the cut-off unit 37a is in a cut-off state, the above compensation current path is not established and the compensation current Io will not flow through the above compensation current path.

In the first embodiment, the noise detection unit 31a detects the common mode noise current. Alternatively, the noise detection unit 31a may detect a common mode noise voltage. In such a case, the noise reduction circuit 30a may estimate the common mode noise current flowing through the path based on the common mode noise voltage detected by the noise detection unit 31a and apply a compensation current to cancel that common mode noise current.

Second Embodiment

Figure 2:
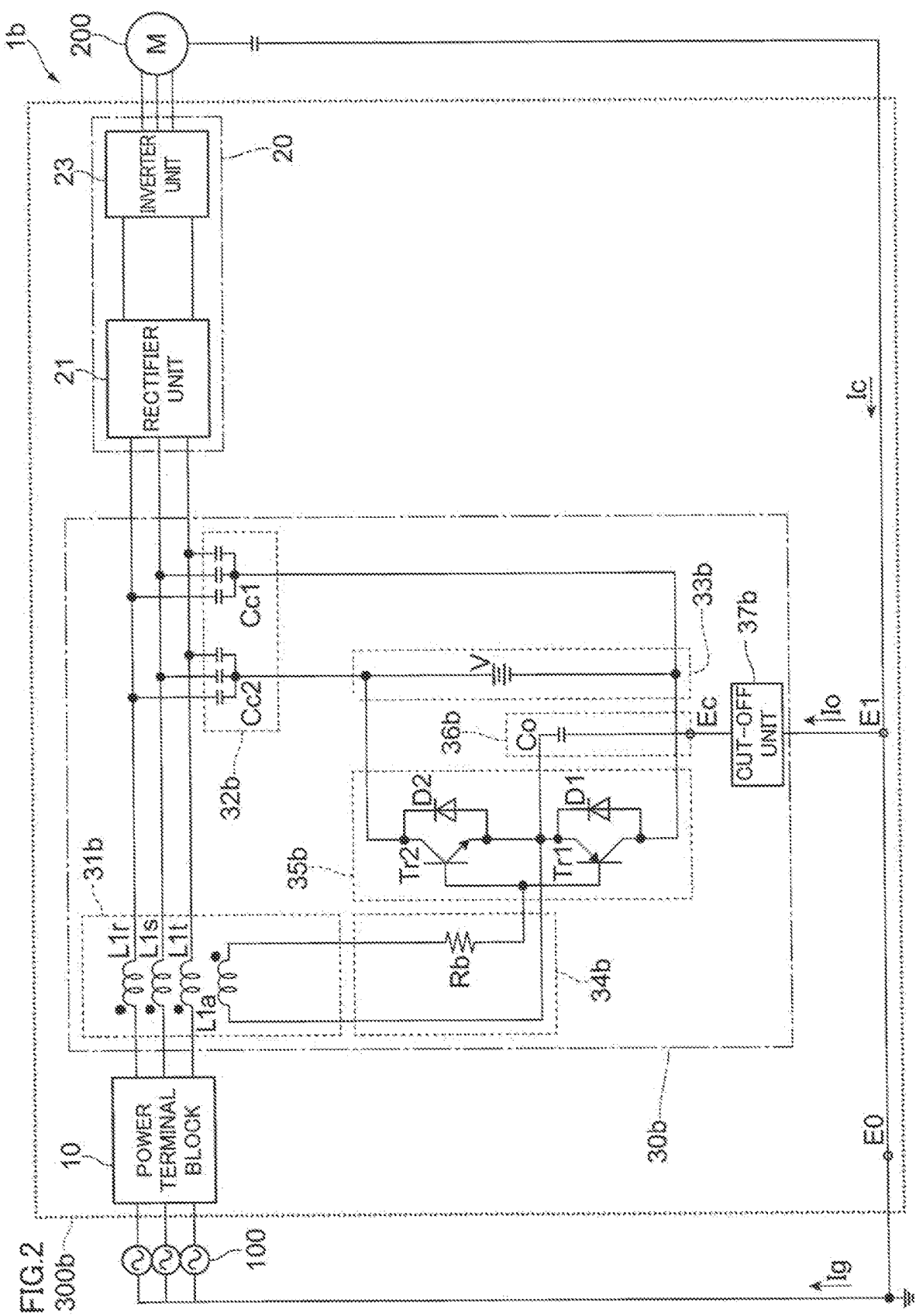
FIG. 2 illustrates a circuit configuration of a power conversion system according to a second embodiment.

FIG. 2 illustrates a circuit configuration of a power conversion system 1b according to a second embodiment. As shown in the figure, the power conversion system 1b includes the AC power supply 100, the motor 200, and a power conversion device 300b.

The AC power supply 100 and the motor 200 are similar to those described in the first embodiment, so that descriptions thereof are omitted.

The power conversion device 300b includes the power terminal block 10, the power converter 20, and a noise reduction circuit 30b.

The power terminal block 10 and the power converter 20 are similar to those described in the first embodiment, so that descriptions thereof are omitted.

The noise reduction circuit 30b is an active common mode noise reduction circuit that detects common mode noise and performs feedback control to suppress it. The noise reduction circuit 30b includes a noise detection unit 31b, a coupling capacitor unit 32b, a DC power supply unit 33b, a detection circuit 34b, an amplifier 35b, an output capacitor unit 36b, and a cut-off unit 37b.

The noise detection unit 31b, the DC power supply unit 33b, the detection circuit 34b, and the amplifier 35b are respectively similar to the noise detection unit 31a, the DC power supply unit 33a, the detection circuit 34a, and the amplifier 35a in the first embodiment, so that descriptions thereof are omitted.

The coupling capacitor unit 32b includes coupling capacitors Cc1 and Cc2. Three terminals of the coupling capacitor Cc1 on one end thereof are connected to the R-, S-, and T-phase power lines, respectively. The terminal of the coupling capacitor Cc1 on the other end thereof is connected to the DC power supply unit 33b and the amplifier 35b. Three terminals of the coupling capacitor Cc2 on one end thereof are connected to the R-, S-, and T-phase power lines, respectively. The terminal of the coupling capacitor Cc2 on the other end thereof is connected to the DC power supply unit 33b and the amplifier 35b. The coupling capacitor unit 32b defines a path for flow of a compensation current between the R-, S-, and T-phase power lines and the amplifier 35b through the coupling capacitors Cc1 and Cc2.

The output capacitor unit 36b includes the output capacitor Co. The output capacitor Co is connected on its one end to a connection point of the first and second transistors Tr1 and Tr2 on the emitter side, and is connected on its other end to the compensation current path connection terminal Ec. Other implementations are also possible where the output capacitor unit 36b is absent or the output capacitor unit 36b includes, in addition to the output capacitor Co, a resistor directly connected to the output capacitor Co. Still alternatively, an implementation is possible where the output capacitor unit 36b is connected to the power lines and the DC power supply unit 33b is connected to the ground either directly or via a coupling capacitor.

In the second embodiment, the detection circuit 34b, the amplifier 35b, and the output capacitor unit 36b constitute a noise canceler.

The cut-off unit 37b is connected between the compensation current path connection terminal Ec and the ground terminal E1 of the housing. Alternatively, the cut-off unit 37b may be connected between the compensation current path connection terminal Ec and the output capacitor Co or between the amplifier 35b and the output capacitor Co. The functions of the cut-off unit 37b are similar to those of the cut-off unit 37a in the first embodiment, so that the description thereof is omitted.

The operation of the power conversion system 1b according to the second embodiment will now be described.

The commercial AC power supply 100 supplies an AC voltage to the power converter 20 via the power terminal block 10. In the power converter 20, the rectifier unit 21 rectifies the AC voltage supplied from the AC power supply 100 to a DC voltage. The inverter unit 23 supplies an AC voltage to the motor 200 through on/off control of the switching element.

In this case, a common mode noise current Ic flows from the motor 200 every time a pulsed voltage is applied from the inverter unit 23, as shown in the figure. The noise detection unit 31b detects the common mode noise current in the power lines input to the power converter 20 and drives the first and second transistors Tr1 and Tr2. In response to a detection current from the noise detection unit 31b flowing into the bases of the first and second transistors Tr1 and Tr2, this current is amplified by the first and second transistors Tr1 and Tr2.

First, the case in which the cut-off unit 37b is in a conductive state is described.

When the first transistor Tr1 is on (when a positive common mode noise current Ic is generated), a compensation current Io is supplied from the DC power supply V and flows along a current path (compensation current path) that runs from the positive terminal of the DC power supply V through the coupling capacitor Cc2, the AC power supply 100, the output capacitor Co, and the first transistor Tr1 to the negative terminal of the DC power supply V. In this case, the common mode noise current Ic, the compensation current Io, and the post-compensation common mode noise current Ig flow in the direction of the arrows in the figure. The compensation current Io reduces the common mode noise current Ic by being subtracted from the common mode noise current Ic from the motor 200. In other words, the compensation current Io compensates for the common mode noise current Ic.

When the second transistor Tr2 is on (when a negative common mode noise current Ic is generated), the compensation current Io is supplied from the DC power supply V and flows along a current path (compensation current path) that runs from the positive terminal of the DC power supply V through the second transistor Tr2, the output capacitor Co, the AC power supply 100, and the coupling capacitor Cc1 to the negative terminal of the DC power supply V. In this case, the common mode noise current Ic, the compensation current Io, and the post-compensation common mode noise current Ig flow in the direction opposite the arrows in the figure. The negative compensation current Io reduces the common mode noise current Ic by being subtracted from the negative common mode noise current Ic from the motor 200. In other words, the compensation current Io compensates for the common mode noise current Ic.

As described above, in both cases when the first transistor Tr1 is on and when the second transistor Tr2 is on, the post-compensation common mode noise current Ig flows in the AC power supply 100.

On the other hand, when the cut-off unit 37b is in a cut-off state, the above compensation current path is not established and the compensation current Io will not flow through the above compensation current path.

In the second embodiment, the noise detection unit 31b detects the common mode noise current. Alternatively, the noise detection unit 31b may detect a common mode noise voltage. In such a case, the noise reduction circuit 30b may estimate the common mode noise current flowing through the path based on the common mode noise voltage detected by the noise detection unit 31b and apply a compensation current to cancel that common mode noise current.

Third Embodiment

Figure 3:
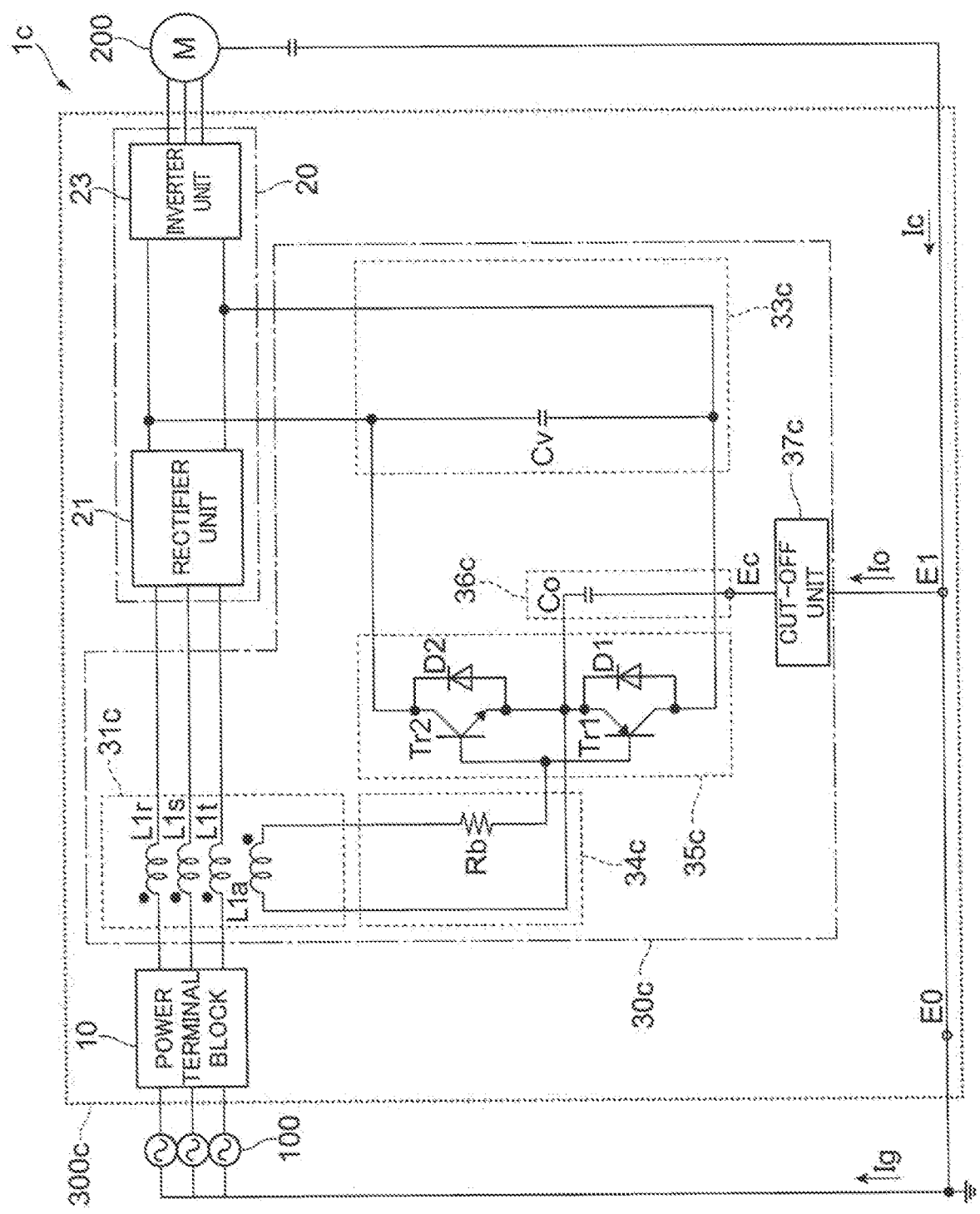
FIG. 3 illustrates a circuit configuration of a power conversion system according to a third embodiment.

FIG. 3 illustrates a circuit configuration of a power conversion system 1c according to a third embodiment. As shown in the figure, the power conversion system 1c includes the AC power supply 100, the motor 200, and a power conversion device 300c.

The AC power supply 100 and the motor 200 are similar to those described in the first embodiment, so that descriptions thereof are omitted.

The power conversion device 300c includes the power terminal block 10, the power converter 20, and a noise reduction circuit 30c.

The power terminal block 10 and the power converter 20 are similar to those described in the first embodiment, so that descriptions thereof are omitted.

The noise reduction circuit 30c is an active common mode noise reduction circuit that detects common mode noise and performs feedback control to suppress it. The noise reduction circuit 30c includes a noise detection unit 31c, a DC power supply unit 33c, a detection circuit 34c, an amplifier 35c, an output capacitor unit 36c, and a cut-off unit 37c.

The noise detection unit 31c, the detection circuit 34c, and the amplifier 35c are respectively similar to the noise detection unit 31a, the detection circuit 34a, and the amplifier 35a in the first embodiment, so that descriptions thereof are omitted.

The DC power supply unit 33c includes a capacitor Cv connected in parallel to the amplifier 35c. The capacitor Cv is connected on its one end to the lower power line in the power converter 20 and is connected on its other end to the upper power line in the power converter 20, each between the rectifier unit 21 and the inverter unit 23. As a result, the DC power supply unit 33c functions as a power supply for the DC link voltage of the power converter 20. It should be noted that the DC power supply unit 33c may not include the capacitor Cv.

The output capacitor unit 36c includes the output capacitor Co. The output capacitor Co is connected on its one end to a connection point of the first and second transistors Tr1 and Tr2 on the emitter side, and is connected on its other end to the compensation current path connection terminal Ec. Other implementations are also possible where the output capacitor unit 36c is absent or the output capacitor unit 36c includes, in addition to the output capacitor Co, a resistor directly connected to the output capacitor Co. Still alternatively, an implementation is possible where the output capacitor unit 36c is connected to the power lines and the DC power supply unit 33c is connected to the ground either directly or via a coupling capacitor.

In the third embodiment, the detection circuit 34c, the amplifier 35c, and the output capacitor unit 36c constitute a noise canceler.

The cut-off unit 37c is connected between the compensation current path connection terminal Ec and the ground terminal E1 of the housing. Alternatively, the cut-off unit 37c may be connected between the compensation current path connection terminal Ec and the output capacitor Co or between the amplifier 35c and the output capacitor Co. The functions of the cut-off unit 37c are similar to those of the cut-off unit 37a in the first embodiment, so that the description thereof is omitted.

The operation of the power conversion system 1c according to the third embodiment will now be described.

The commercial AC power supply 100 supplies an AC voltage to the power converter 20 via the power terminal block 10. In the power converter 20, the rectifier unit 21 rectifies the AC voltage supplied from the AC power supply 100 to a DC voltage. The inverter unit 23 supplies an AC voltage to the motor 200 through on/off control of the switching element.

In this case, a common mode noise current Ic flows from the motor 200 every time a pulsed voltage is applied from the inverter unit 23, as shown in the figure. The noise detection unit 31c detects the common mode noise current in the power lines input to the power converter 20 and drives the first and second transistors Tr1 and Tr2. In response to a detection current from the noise detection unit 31c flowing into the bases of the first and second transistors Tr1 and Tr2, this current is amplified by the first and second transistors Tr1 and Tr2.

First, the case in which the cut-off unit 37c is in a conductive state is described.

When the first transistor Tr1 is on (when a positive common mode noise current Ic is generated), a compensation current Io flows along a current path (compensation current path) that runs from ground through the output capacitor Co and the first transistor Tr1 to the lower power line in the power converter 20. In this case, the common mode noise current Ic, the compensation current Io, and the post-compensation common mode noise current Ig flow in the direction of the arrows in the figure. The compensation current Io reduces the common mode noise current Ic by being subtracted from the common mode noise current Ic from the motor 200. In other words, the compensation current Io compensates for the common mode noise current Ic.

When the second transistor Tr2 is on (when a negative common mode noise current Ic is generated), the compensation current Io flows along a current path (compensation current path) that runs from the upper power line in the power converter 20 through the second transistor Tr2 and the output capacitor Co to ground. In this case, the common mode noise current Ic, the compensation current Io, and the post-compensation common mode noise current Ig flow in the direction opposite the arrows in the figure. The negative compensation current Io reduces the common mode noise current Ic by being subtracted from the negative common mode noise current Ic from the motor 200. In other words, the compensation current Io compensates for the common mode noise current Ic.

As described above, in both cases when the first transistor Tr1 is on and when the second transistor Tr2 is on, the post-compensation common mode noise current Ig flows in the AC power supply 100.

On the other hand, when the cut-off unit 37c is in a cut-off state, the above compensation current path is not established and the compensation current Io will not flow through the above compensation current path.

In the third embodiment, the noise detection unit 31c detects the common mode noise current. Alternatively, the noise detection unit 31c may detect a common mode noise voltage. In such a case, the noise reduction circuit 30c may estimate the common mode noise current flowing through the path based on the common mode noise voltage detected by the noise detection unit 31c and apply a compensation current to cancel that common mode noise current.

Fourth Embodiment

Figure 4:
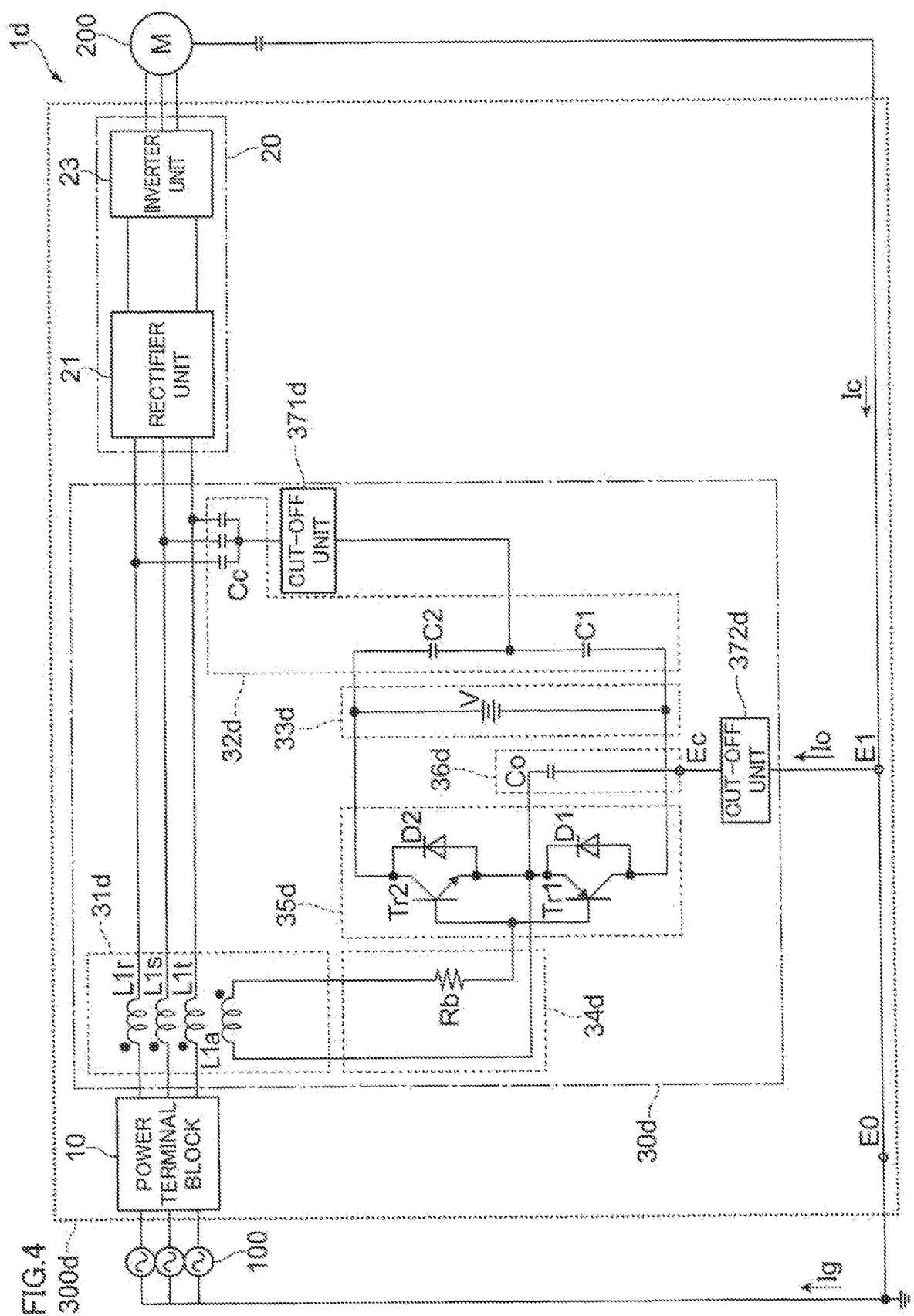
FIG. 4 illustrates a circuit configuration of a power conversion system according to a fourth embodiment.

FIG. 4 illustrates a circuit configuration of a power conversion system 1d according to a fourth embodiment. As shown in the figure, the power conversion system 1d includes the AC power supply 100, the motor 200, and a power conversion device 300d.

The AC power supply 100 and the motor 200 are similar to those described in the first embodiment, so that descriptions thereof are omitted.

The power conversion device 300d includes the power terminal block 10, the power converter 20, and a noise reduction circuit 30d.

The power terminal block 10 and the power converter 20 are similar to those described in the first embodiment, so that descriptions thereof are omitted.

The noise reduction circuit 30d is an active common mode noise reduction circuit that detects common mode noise and performs feedback control to suppress it. The noise reduction circuit 30d includes a noise detection unit 31d, a coupling capacitor unit 32d, a DC power supply unit 33d, a detection circuit 34d, an amplifier 35d, an output capacitor unit 36d, and cut-off units 371d and 372d.

The noise detection unit 31d, the coupling capacitor unit 32d, the DC power supply unit 33d, the detection circuit 34c, and the amplifier 35d are respectively similar to the noise detection unit 31a, the coupling capacitor unit 32a, the DC power supply unit 33a, the detection circuit 34a, and the amplifier 35a in the first embodiment, so that descriptions thereof are omitted.

The output capacitor unit 36d includes the output capacitor Co. The output capacitor Co is connected on its one end to a connection point of the first and second transistors Tr1 and Tr2 on the emitter side, and is connected on its other end to the compensation current path connection terminal Ec. Other implementations are also possible where the output capacitor unit 36d is absent or the output capacitor unit 36d includes, in addition to the output capacitor Co, a resistor directly connected to the output capacitor Co. Still alternatively, an implementation is possible where the output capacitor unit 36d is connected to the power lines and the DC power supply unit 33d is connected to the ground either directly or via a coupling capacitor.

In the fourth embodiment, the detection circuit 34d, the amplifier 35d, and the output capacitor unit 36d constitute a noise canceler.

The cut-off unit 371d is connected between the coupling capacitor Cc and a connection point of the series-connected capacitors C1 and C2. The cut-off unit 372d is connected between the compensation current path connection terminal Ec and the ground terminal E1 of the housing. Alternatively, the cut-off unit 372d may be connected between the compensation current path connection terminal Ec and the output capacitor Co or between the amplifier 35d and the output capacitor Co. The functions of the cut-off units 371d and 372d are similar to those of the cut-off unit 37a in the first embodiment, so that the description thereof is omitted.

The operation of the power conversion system 1d according to the fourth embodiment is similar to that of the power conversion system 1a according to the first embodiment except that the cut-off units 371d and 372d operate, so that the description thereof is omitted.

In the fourth embodiment, the noise detection unit 31d detects the common mode noise current. Alternatively, the noise detection unit 31d may detect a common mode noise voltage. In such a case, the noise reduction circuit 30d may estimate the common mode noise current flowing through the path based on the common mode noise voltage detected by the noise detection unit 31d and apply a compensation current to cancel that common mode noise current.

Fifth Embodiment

Figure 5:
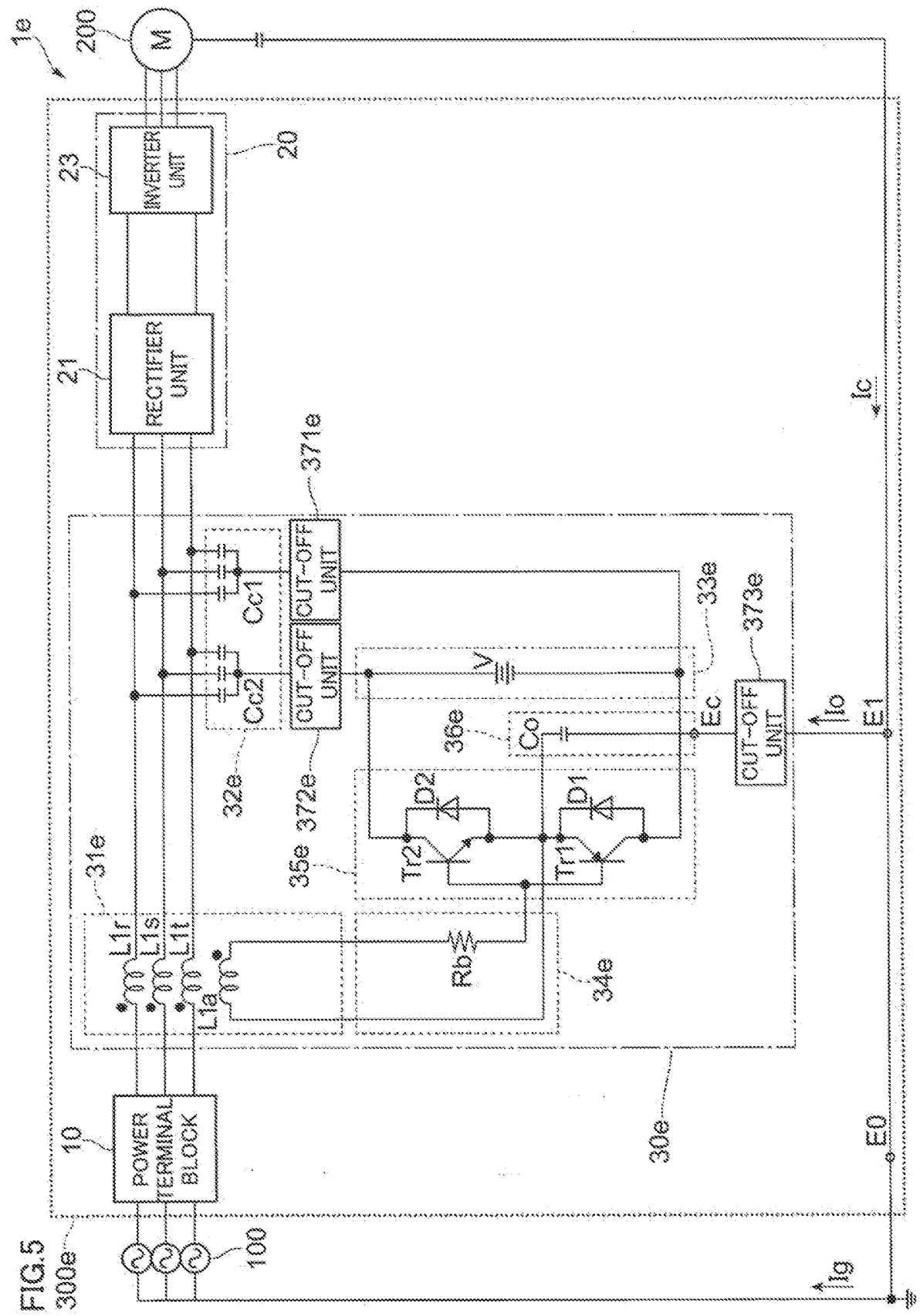
FIG. 5 illustrates a circuit configuration of a power conversion system according to a fifth embodiment.

FIG. 5 illustrates a circuit configuration of a power conversion system 1e according to a fifth embodiment. As shown in the figure, the power conversion system 1e includes the AC power supply 100, the motor 200, and a power conversion device 300e.

The AC power supply 100 and the motor 200 are similar to those described in the first embodiment, so that descriptions thereof are omitted.

The power conversion device 300e includes the power terminal block 10, the power converter 20, and a noise reduction circuit 30e.

The power terminal block 10 and the power converter 20 are similar to those described in the first embodiment, so that descriptions thereof are omitted.

The noise reduction circuit 30e is an active common mode noise reduction circuit that detects common mode noise and performs feedback control to suppress it. The noise reduction circuit 30e includes a noise detection unit 31e, a coupling capacitor unit 32e, a DC power supply unit 33e, a detection circuit 34e, an amplifier 35e, an output capacitor unit 36e, and cut-off units 371e, 372e, and 373e.

The noise detection unit 31e, the DC power supply unit 33e, the detection circuit 34e, and the amplifier 35e are respectively similar to the noise detection unit 31a, the DC power supply unit 33a, the detection circuit 34a, and the amplifier 35a in the first embodiment, so that descriptions thereof are omitted.

The coupling capacitor unit 32e includes the coupling capacitors Cc1 and Cc2. Three terminals of the coupling capacitor Cc1 on one end thereof are connected to the R-, S-, and T-phase power lines, respectively. The terminal of the coupling capacitor Cc1 on the other end thereof is connected to the cut-off unit 371e. Three terminals of the coupling capacitor Cc2 on one end thereof are connected to the R-, S-, and T-phase power lines, respectively. The terminal of the coupling capacitor Cc2 on the other end thereof is connected to the cut-off unit 372e. The coupling capacitor unit 32e defines a path for flow of a compensation current between the R-, S-, and T-phase power lines and the amplifier 35e through the coupling capacitors Cc1 and Cc2.

The output capacitor unit 36e includes the output capacitor Co. The output capacitor Co is connected on its one end to a connection point of the first and second transistors Tr1 and Tr2 on the emitter side, and is connected on its other end to the compensation current path connection terminal Ec. Other implementations are also possible where the output capacitor unit 36e is absent or the output capacitor unit 36e includes, in addition to the output capacitor Co, a resistor directly connected to the output capacitor Co. Still alternatively, an implementation is possible where the output capacitor unit 36e is connected to the power lines and the DC power supply unit 33e is connected to the ground either directly or via a coupling capacitor.

In the fifth embodiment, the detection circuit 34e, the amplifier 35e, and the output capacitor unit 36e constitute a noise canceler.

The cut-off unit 371e is connected between a collector-side terminal of the first transistor Tr1, which is connected to the negative side of the DC power supply V, and the lower power line in the power converter 20. The cut-off unit 372e is connected between a collector-side terminal of the second transistor Tr2, which is connected to the positive side of the DC power supply V, and the upper power line in the power converter 20. The cut-off unit 373e is connected between the compensation current path connection terminal Ec and the ground terminal E1 of the housing. Alternatively, the cut-off unit 373e may be connected between the compensation current path connection terminal Ec and the output capacitor Co or between the amplifier 35e and the output capacitor Co. The functions of the cut-off units 371e, 372e, and 373e are similar to those of the cut-off unit 37a in the first embodiment, so that the description thereof is omitted.

The operation of the power conversion system 1e according to the fifth embodiment is similar to that of the power conversion system 1a according to the first embodiment except that the cut-off units 371e, 372e, and 373e operate, so that the description thereof is omitted.

In the fifth embodiment, the noise detection unit 31e detects the common mode noise current. Alternatively, the noise detection unit 31e may detect a common mode noise voltage. In such a case, the noise reduction circuit 30e may estimate the common mode noise current flowing through the path based on the common mode noise voltage detected by the noise detection unit 31e and apply a compensation current to cancel that common mode noise current.

Sixth Embodiment

Figure 6:
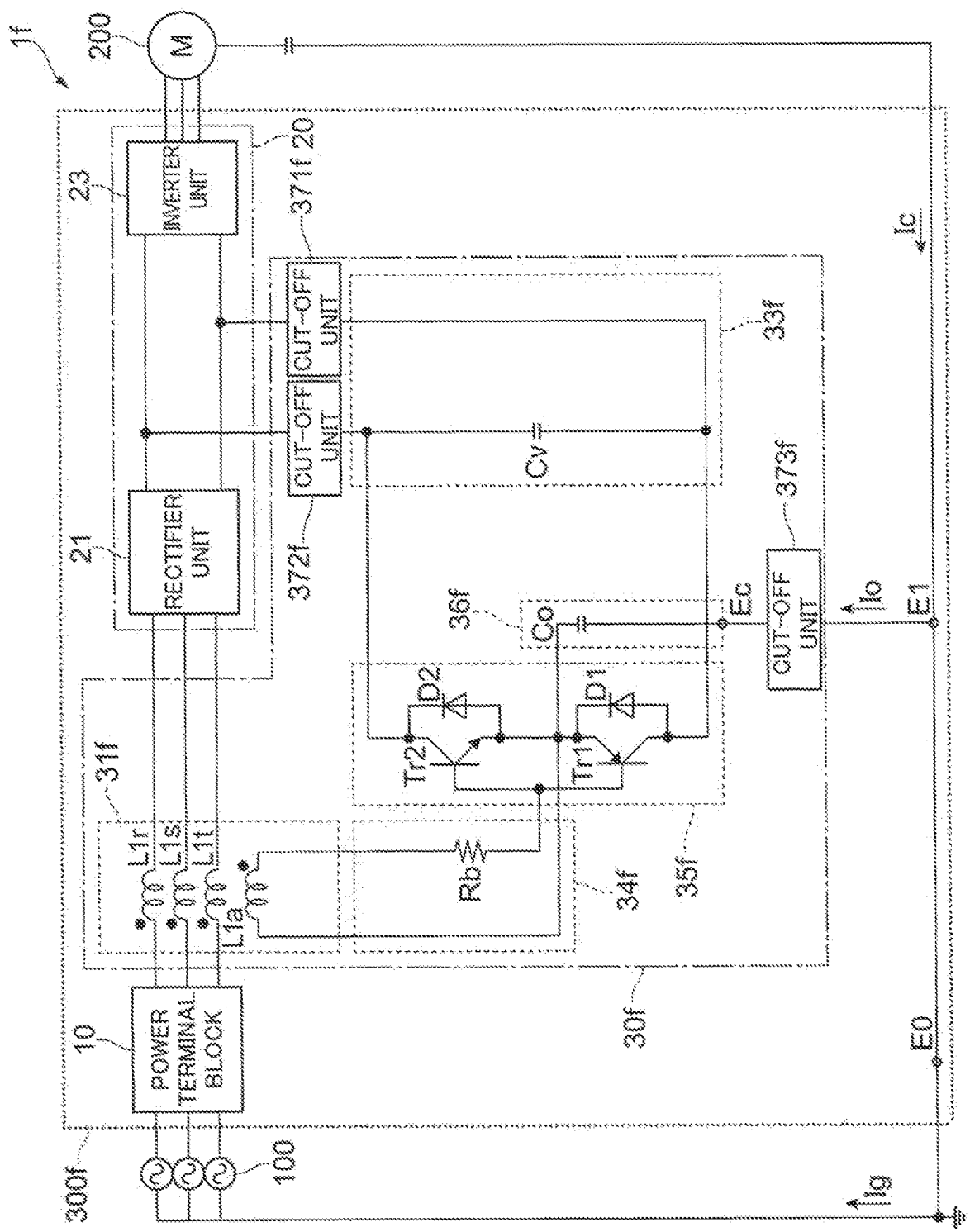
FIG. 6 illustrates a circuit configuration of a power conversion system according to a sixth embodiment.

FIG. 6 illustrates a circuit configuration of a power conversion system if according to a sixth embodiment. As shown in the figure, the power conversion system if includes the AC power supply 100, the motor 200, and a power conversion device 300f.

The AC power supply 100 and the motor 200 are similar to those described in the first embodiment, so that descriptions thereof are omitted.

The power conversion device 300f includes the power terminal block 10, the power converter 20, and a noise reduction circuit 30f.

The power terminal block 10 and the power converter 20 are similar to those described in the first embodiment, so that descriptions thereof are omitted.

The noise reduction circuit 30f is an active common mode noise reduction circuit that detects common mode noise and performs feedback control to suppress it. The noise reduction circuit 30f includes a noise detection unit 31f, a DC power supply unit 33f, a detection circuit 34f, an amplifier 35f, an output capacitor unit 36f, and cut-off units 371f, 372f, and 373f.

The noise detection unit 31f, the detection circuit 34f, and the amplifier 35f are respectively similar to the noise detection unit 31a, the detection circuit 34a, and the amplifier 35a in the first embodiment, so that descriptions thereof are omitted.

The DC power supply unit 33f includes the capacitor Cv connected in parallel to the amplifier 35f. The capacitor Cv is connected on its one end to the lower power line in the power converter 20 via the cut-off unit 371f and is connected on its other end to the upper power line in the power converter 20 via the cut-off unit 372f, each between the rectifier unit 21 and the inverter unit 23. As a result, the DC power supply unit 33f functions as a power supply for the DC link voltage of the power converter 20. It should be noted that the DC power supply unit 33f may not include the capacitor Cv.

The output capacitor unit 36f includes the output capacitor Co. The output capacitor Co is connected on its one end to a connection point of the first and second transistors Tr1 and Tr2 on the emitter side, and is connected on its other end to the compensation current path connection terminal Ec. Other implementations are also possible where the output capacitor unit 36f is absent or the output capacitor unit 36f includes, in addition to the output capacitor Co, a resistor directly connected to the output capacitor Co. Still alternatively, an implementation is possible where the output capacitor unit 36f is connected to the power lines and the DC power supply unit 33f is connected to the ground either directly or via a coupling capacitor.

In the sixth embodiment, the detection circuit 34f, the amplifier 35f, and the output capacitor unit 36f constitute a noise canceler.

The cut-off unit 371f is connected between a collector-side terminal of the first transistor Tr1, which is connected to one end of the capacitor Cv, and the lower power line in the power converter 20. The cut-off unit 372f is connected between a collector-side terminal of the second transistor Tr2, which is connected to the other end of the capacitor Cv, and the upper power line in the power converter 20. The cut-off unit 373f is connected between the compensation current path connection terminal Ec and the ground terminal E1 of the housing. Alternatively, the cut-off unit 373f may be connected between the compensation current path connection terminal Ec and the output capacitor Co or between the amplifier 35f and the output capacitor Co. The functions of the cut-off units 371f, 372f, and 373f are similar to those of the cut-off unit 37a in the first embodiment, so that the description thereof is omitted.

The operation of the power conversion system if according to the sixth embodiment is similar to that of the power conversion system 1a according to the first embodiment except that the cut-off units 371f, 372f, and 373f operate, so that the description thereof is omitted.

In the sixth embodiment, the noise detection unit 31f detects the common mode noise current. Alternatively, the noise detection unit 31f may detect a common mode noise voltage. In such a case, the noise reduction circuit 30f may estimate the common mode noise current flowing through the path based on the common mode noise voltage detected by the noise detection unit 31f and apply a compensation current to cancel that common mode noise current.

Seventh Embodiment

Figure 7:
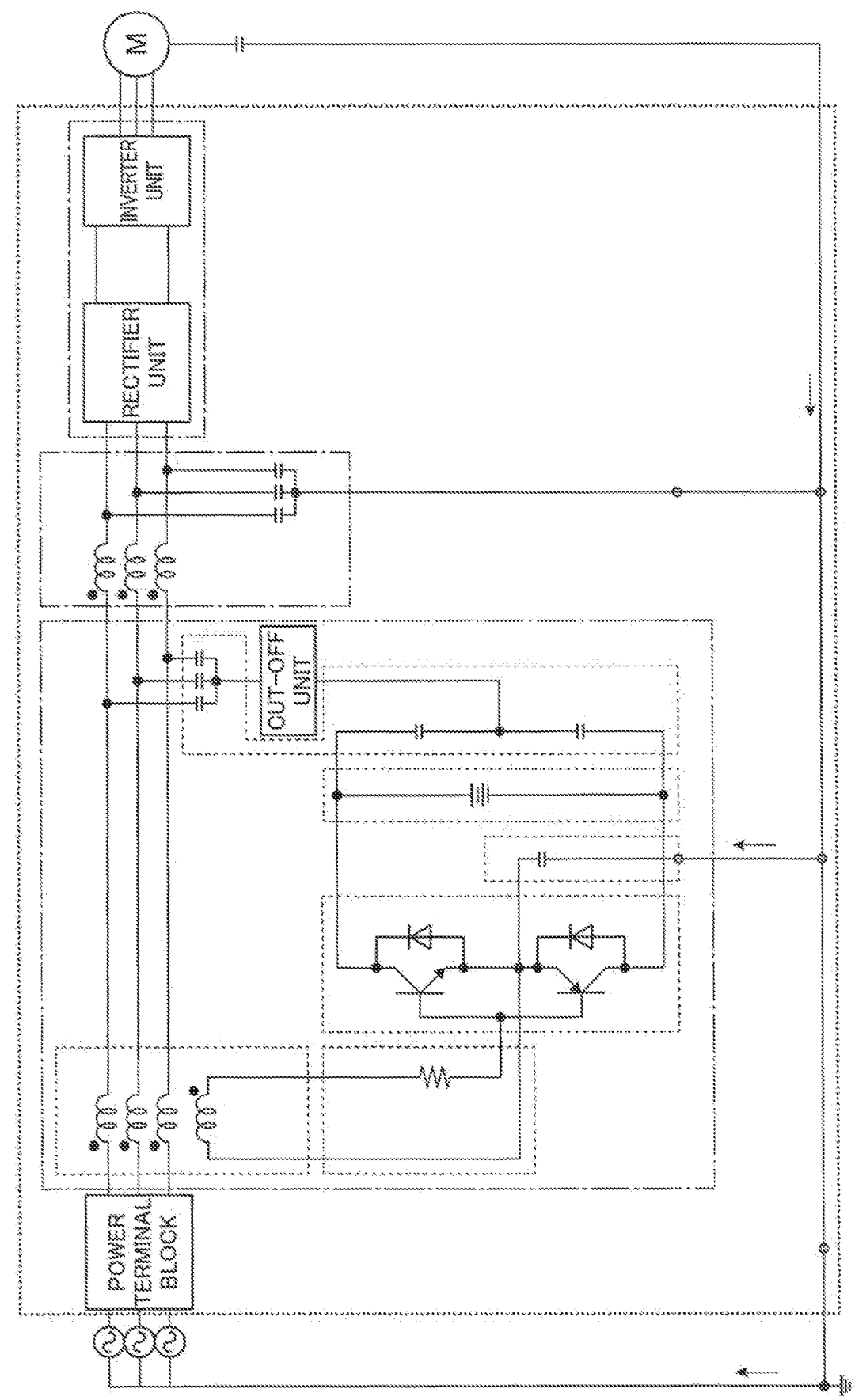
FIG. 7 illustrates a circuit configuration of a power conversion system according to a seventh embodiment.

FIG. 7 illustrates a circuit configuration of a power conversion system 1g according to a seventh embodiment. As shown in the figure, the power conversion system 1g includes the AC power supply 100, the motor 200, and a power conversion device 300g.

The AC power supply 100 and the motor 200 are similar to those described in the first embodiment, so that descriptions thereof are omitted.

The power conversion device 300g includes the power terminal block 10, the power converter 20, a noise reduction circuit 30g, and a noise filter 40g.

The power terminal block 10 and the power converter 20 are similar to those described in the first embodiment, so that descriptions thereof are omitted.

The noise reduction circuit 30g is an active common mode noise reduction circuit that detects common mode noise and performs feedback control to suppress it. The noise reduction circuit 30g includes a noise detection unit 31g, a coupling capacitor unit 32g, a DC power supply unit 33g, a detection circuit 34g, an amplifier 35g, an output capacitor unit 36g, and a cut-off unit 37g.

The noise detection unit 31g, the coupling capacitor unit 32g, the DC power supply unit 33g, the detection circuit 34g, the amplifier 35g, the output capacitor unit 36g, and the cut-off unit 37g are respectively similar to the noise detection unit 31a, the coupling capacitor unit 32a, the DC power supply unit 33a, the detection circuit 34a, the amplifier 35a, the output capacitor unit 36a, and the cut-off unit 37a in the first embodiment, so that descriptions thereof are omitted.

In the seventh embodiment, the detection circuit 34g, the amplifier 35g, and the output capacitor unit 36g constitute a noise canceler.

The noise filter 40g is connected between the power converter 20 and the noise reduction circuit 30g. The noise filter 40g reduces the common mode noise. The noise filter 40g includes common mode choke coils L2r, L2s, and L2t, and a Y-capacitor Cy. The common mode choke coils L2r, L2s, and L2t are a pair of coils connected to each of the R-, S-, and T-phase power lines. The Y-capacitor Cy is a capacitor provided between the R-, S-, and T-phase power lines and the ground. The Y-capacitor Cy is connected to a ground terminal E2 of the housing via a ground terminal Ef of the noise filter 40g.

The operation of the power conversion system 1g according to the seventh embodiment is similar to that of the power conversion system 1a according to the first embodiment except that the cut-off unit 37g operates, so that the description thereof is omitted.

In the seventh embodiment, the noise detection unit 31g detects the common mode noise current. Alternatively, the noise detection unit 31g may detect a common mode noise voltage. In such a case, the noise reduction circuit 30g may estimate the common mode noise current flowing through the path based on the common mode noise voltage detected by the noise detection unit 31g and apply a compensation current to cancel that common mode noise current.

In the seventh embodiment, the noise filter 40g is added to the circuit configuration in FIG. 1. However, the noise filter 40g may be added to any of the circuit configurations in FIGS. 2, 4, and 5.

Variations

In each of the above embodiments, the compensation current path is defined on the AC power supply 100 side, and the cut-off unit(s) is provided on this path. This is because cutting off the path on the power lines on the AC power supply 100 side with respect to the noise detection unit 31 can also cut off the noise detection unit 31, which can further reduce the risk of breakdown.

On the other hand, when the compensation current path is defined on the power converter 20 side, the cut-off unit(s) may be provided on that path.

In both cases where the compensation current path is defined on the AC power supply 100 side and where the compensation current path is defined on the power converter 20 side, the cut-off unit(s) may be provided on the power lines. In such cases, the cut-off unit(s) may cut off all phases.

Refrigeration Apparatus

Figure 8:
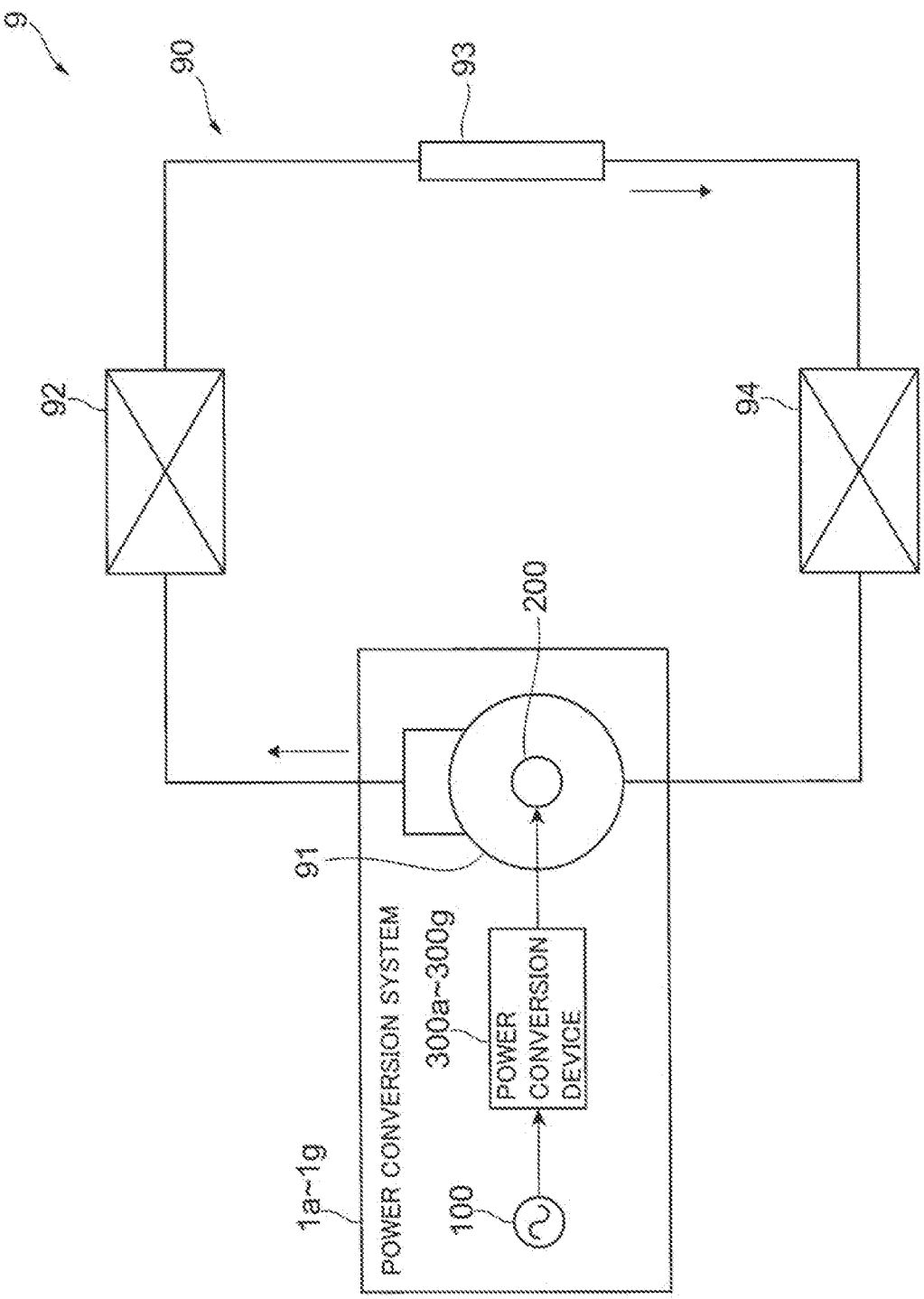
FIG. 8 illustrates an example piping system of a refrigeration apparatus according to certain embodiments.

FIG. 8 illustrates an example piping system of a refrigeration apparatus 9 according to certain embodiments. The refrigeration apparatus 9 circulates refrigerant in a refrigerant circuit to perform a refrigeration cycle. In the refrigerant circuit 90, a compressor 91, a condenser 92, an expansion mechanism 93, and an evaporator 94 are sequentially connected by piping, as shown in the figure.

The compressor 91 compresses low-pressure gas refrigerant and discharges high-pressure gas refrigerant using power from the motor 200. The motor 200 is included in the power conversion systems 1a-1g in FIGS. 1-7, and the power conversion devices 300a-300g drive the motor 200 using the AC power supply 100 as the power source.

The condenser 92 condenses the high-pressure gas refrigerant discharged from the compressor 91 and discharges high-pressure liquid refrigerant. The expansion mechanism 93 expands the high-pressure liquid refrigerant discharged from the condenser 92 and discharges low-pressure refrigerant in a gas-liquid mixed phase. The evaporator 94 evaporates the liquid refrigerant in the expanded low-pressure refrigerant in the gas-liquid mixed phase discharged from the expansion mechanism 93 and discharges low-pressure gas refrigerant.

Functions and Effects of Embodiments

In the present embodiments, the noise reduction circuits 30a-30g each include: the noise canceler configured to inject a compensation current into the power line and ground to reduce a common mode noise current that flows through the power line and ground into the AC power supply 100 from the power converter 20 with a switching element connected to the AC power supply 100; and a corresponding one(s) of the cut-off units 37a-37c, 371d-371f, 372d-372f, 373e, 373f, and 37g provided on the compensation current path through which the compensation current flows and configured to inhibit application of an overcurrent to the noise canceler.

These noise reduction circuits 30a-30g can reduce the possibility of the noise canceler being destroyed even if a lightning surge or power supply noise is superimposed on the power line.

In the present embodiments, the cut-off units 37a-37c, 371d-371f, 372d-372f, 373e, 373f, and 37g may each be connected in series on the electrical path of the compensation current path through which the compensation current flows.

In the present embodiments, the cut-off units 37a-37c, 371d-371f, 372d-372f, 373e, 373f, and 37g may each be provided on the path through which the noise canceler injects the compensation current toward the power line between the AC power supply 100 and the power converter 20 and toward ground.

This can protect the noise canceler by disconnecting it from the power line and ground.

In the present embodiments, the cut-off units 37a-37c, 371d-371f, 372d-372f, 373e, 373f, and 37g may each be a switching section configured to switch the compensation current path between conduction and cut-off or between high impedance and low impedance.

This can protect the noise canceler only when necessary.

In the present embodiments, the voltage of the DC power supply units 33c and 33f configured to supply power to the noise canceler may be the DC link voltage of the power converter 20.

This eliminates the need for a separate DC power supply to supply power to the noise canceler.

In the present embodiments, the voltage of the DC power supply units 33a, 33b, 33d, 33e, 33g configured to supply power to the noise canceler may be lower than the peak value of the DC link voltage of the power converter 20.

This can reduce the breakdown voltage of the components that constitute the noise canceler.

In the present embodiments, the DC power supply units 33a, 33b, 33d, 33e, 33g may be connected to the power line respectively via the coupling capacitor units 32a, 32b, 32d, 32e, 32g.

This can draw the common mode noise current from the power lines.

The noise reduction circuits 30a-30g according to the present embodiments respectively include the DC power supply units 33a-33g configured to supply power to the noise canceler. The noise canceler includes: any of the detection circuits 34a-34g configured to detect a common mode noise current flowing in the power lines; any of the amplifiers 35a-35g configured to amplify the detection signal of any of the detection circuits 34a-34g using any of the DC power supply units 33a-33g as a power source; and any of the output capacitor units 36a-36g for passing the compensation current from the output of any of the amplifiers 35a-35g to the power line or ground. The DC power supply units 33a-33g each form a conductive path with one of the power line and ground, and the output capacitor units 36a-36g are each connected between the other of the power line and ground and the output of any of the amplifiers 35a-35g. The cut-off units 37a-37c, 371d-371f, 372d-372f, 373e, 373f, and 37g are each a switching section configured to switch the compensation current path between conduction and cut-off or between high impedance and low impedance. The switching section is connected between one of the power line and ground and any of the DC power supply units 33a-33g, or between the other of the power line and ground and the output of any of the amplifiers 35a-35g.

This can protect the noise canceler, only when necessary, by disconnecting it from the power line and ground.

In the present embodiments, the switching section may be configured to make the compensation current path conductive in response to a DC voltage being applied to any of the amplifiers 35a-35g from any of the DC power supply units 33a-33g, and to cut off the compensation current path absent application of a DC voltage to any of the amplifiers 35a-35g from any of the DC power supply units 33a-33g.

This will not prevent an overcurrent from flowing into the noise canceler when the noise canceler is functioning.

In the present embodiments, the switching section may be configured to, when the compensation current path is in a conductive state, cut off the compensation current path in response to the absolute value of the neutral point voltage of the power line with respect to ground fluctuating above a voltage that is $\sqrt{2} \times 1.1$ times the rated voltage in the commercial power supply, or AC power supply 100, or in response to an overcurrent being applied to any of the amplifiers 35a-35g.

This can prevent an overcurrent from flowing into the noise canceler if a lightning surge or power supply noise is superimposed on the power line while the noise canceler is functioning.

In the present embodiment, the switching section may be configured to place the compensation current path into a low impedance state in response to a DC voltage being applied to any of the amplifiers 35a-35g from any of the DC power supply units 33a-33g, and to place the compensation current path into a high impedance state absent application of a DC voltage to any of the amplifiers 35a-35g from any of the DC power supply units 33a-33g.

This will not inhibit an overcurrent from flowing into the noise canceler when the noise canceler is functioning.

In the present embodiments, the switching section may be configured to, when the compensation current path is in a low impedance state, place the compensation current path into a high impedance state in response to the absolute value of the neutral point voltage of the power line with respect to ground fluctuating above a voltage that is $\sqrt{2} \times 1.1$ times the rated voltage in the commercial power supply, or the AC power supply 100, or in response to an overcurrent being applied to any of the amplifiers 35a-35g.

This can inhibit an overcurrent from flowing into the noise canceler if a lightning surge or power supply noise is superimposed on the power line while the noise canceler is functioning.

The power conversion devices 300a-300g according to the present embodiments include: the noise filter 40g connected between the AC power supply 100 and the power converter 20; and any of the above noise reduction circuits 30a-30g connected closer to the AC power supply 100 with respect to the noise filter 40g.

This can reduce the possibility of the noise canceler being destroyed in the event of a lightning surge or power supply noise being superimposed on the power line, even if the noise canceler is connected closer to the AC power supply 100 with respect to the noise filter 40g.

The refrigeration apparatus 9 according to the present embodiments includes any of the above noise reduction circuits 30a-30g or any of the above power conversion devices 300a-300g.

This refrigeration apparatus 9 can reduce the possibility of the noise canceler being destroyed even if a lightning surge or power supply noise is superimposed on the power line.

While certain embodiments have been described above, it will be understood that various changes in form and detail can be made without departing from the spirit and scope of the invention as defined by the appended claims.

| Reference Signs List | |
|---|---|
| 1a-1g | Power conversion system |
| 10 | Power terminal block |
| 20 | Power converter |
| 21 | Rectifier unit |
| 23 | Inverter unit |
| 30a-30g | Noise reduction circuit |
| 31a-31g | Noise detection unit |
| 32a, 32b, 32d, 32e, 32g | Coupling capacitor unit |
| 33a-33g | DC power supply unit |
| 34a-34g | Detection circuit |
| 35a-35g | Amplifier |
| 36a-36g | Output capacitor unit |
| 37a-37c, 371d-371f, 372d-372f, 373e, 373f, 37g | Cut-off unit |
| 40g | Noise filter |
| 100 | AC power supply |
| 200 | Motor |
| 300a-300g | Power conversion device |

The invention claimed is:

1. A noise reduction circuit comprising:
noise canceler circuitry configured to inject a compensation current into a power line and ground to reduce a common mode noise current that flows through the power line and the ground into a commercial power supply from a power converter with a switching element connected to the commercial power supply; and
overcurrent inhibitor circuitry provided on a compensation current path through which the compensation current flows, the overcurrent inhibitor circuitry being configured to inhibit application of an overcurrent to the noise canceler circuitry.

2. The noise reduction circuit according to claim 1, wherein the overcurrent inhibitor circuitry is connected in series on an electrical path of the compensation current path through which the compensation current flows.

3. The noise reduction circuit according to claim 1, wherein the overcurrent inhibitor circuitry is provided on a path through which the noise canceler circuitry injects the compensation current toward the power line between the commercial power supply and the power converter and toward the ground.

4. The noise reduction circuit according to claim 3, further comprising a DC power supply configured to supply power to the noise canceler circuitry, wherein
the noise canceler circuitry comprises:
a detection circuit configured to detect a common mode noise current flowing through the power line;

an amplifier configured to amplify a detection signal of the detection circuit using the DC power supply as a power source; and an output capacitor for passing the compensation current from an output of the amplifier to the power line or the ground, wherein the DC power supply forms a conductive path with one of the power line and the ground, the output capacitor is connected between the other of the power line and the ground and the output of the amplifier, the overcurrent inhibitor circuitry is switching circuitry configured to switch the compensation current path between conduction and cut-off or between high impedance and low impedance, and the switching circuitry is connected between one of the power line and the ground and the DC power supply, or between the other of the power line and the ground and the output of the amplifier.

5. The noise reduction circuit according to claim 4, wherein the switching circuitry is configured to make the compensation current path conductive in response to a DC voltage being applied to the amplifier from the DC power supply, and to cut off the compensation current path absent application of a DC voltage to the amplifier from the DC power supply.

6. The noise reduction circuit according to claim 5, wherein the switching circuitry is configured to, when the compensation current path is in a conductive state, cut off the compensation current path in response to an absolute value of a neutral point voltage of the power line with respect to the ground fluctuating above a voltage that is √2×1.1 times a rated voltage in the commercial power supply, or in response to an overcurrent being applied to the amplifier.

7. The noise reduction circuit according to claim 4, wherein the switching circuitry is configured to place the compensation current path into a low impedance state in response to a DC voltage being applied to the amplifier from the DC power supply, and to place the compensation current path into a high impedance state absent application of a DC voltage to the amplifier from the DC power supply.

8. The noise reduction circuit according to claim 7, wherein the switching circuitry is configured to, when the compensation current path is in a low impedance state, place the compensation current path into a high impedance state in response to an absolute value of a neutral point voltage of the power line with respect to the ground fluctuating above a voltage that is √2×1.1 times a rated voltage in the commercial power supply, or in response to an overcurrent being applied to the amplifier.

9. The noise reduction circuit according to claim 1, wherein the overcurrent inhibitor circuitry is switching circuitry configured to switch the compensation current path between conduction and cut-off or between high impedance and low impedance.

10. The noise reduction circuit according to claim 1, wherein a voltage of a DC power supply configured to supply power to the noise canceler circuitry is a DC link voltage of the power converter.

11. The noise reduction circuit according to claim 1, wherein a voltage of a DC power supply configured to supply power to the noise canceler circuitry is lower than a peak value of a DC link voltage of the power converter.

12. The noise reduction circuit according to claim 11, wherein the DC power supply is connected to the power line via a coupling capacitor.

13. A power conversion device comprising:
a noise filter connected between the commercial power supply and the power converter; and
the noise reduction circuit according to claim 1, the noise reduction circuit being connected closer to the commercial power supply with respect to the noise filter.

14. A refrigeration apparatus comprising the noise reduction circuit according to claim 1.

* * * * *